US009982320B2

United States Patent
(12) United States Patent
Liddell et al.

(10) Patent No.: US 9,982,320 B2
(45) **Date of Patent: *May 29, 2018**

(54) TREATMENT PROCESS FOR EXTRACTION OF PRECIOUS, BASE AND RARE ELEMENTS

(71) Applicant: LIFEZONE LIMITED, Ebene (MA)

(72) Inventors: Keith Stuart Liddell, Surrey (GB); Lisa Anne Smith, Mosman Park (AU); Michael David Adams, Phuket (TH)

(73) Assignee: LIFEZONE LIMITED, Ebene (MU)

( * ) Notice: Subject to any disclaimer, the term of this patent is extended or adjusted under 35 U.S.C. 154(b) by 220 days.

This patent is subject to a terminal disclaimer.

(21) Appl. No.: 14/950,130

(22) Filed: Nov. 24, 2015

(65) Prior Publication Data

US 2016/0145714 A1 May 26, 2016

(30) Foreign Application Priority Data

Nov. 26, 2014 (ZA) ................................ 2014/08682

(51) Int. Cl.

| | |
|---|---|
| ***C22B 3/00*** | (2006.01) |
| ***C22B 3/08*** | (2006.01) |
| ***C22B 3/20*** | (2006.01) |
| ***C22B 11/06*** | (2006.01) |
| ***C01B 7/07*** | (2006.01) |
| ***C22B 3/10*** | (2006.01) |
| ***C22B 15/00*** | (2006.01) |
| ***C25C 1/20*** | (2006.01) |

(52) U.S. Cl.

CPC .............. *C22B 3/08* (2013.01); *C01B 7/0706* (2013.01); *C01B 7/0712* (2013.01); *C01B 7/0718* (2013.01); *C22B 3/10* (2013.01); *C22B 3/20* (2013.01); *C22B 11/04* (2013.01); *C22B 11/06* (2013.01); *C22B 15/0069* (2013.01); *C22B 15/0071* (2013.01); *C22B 23/043* (2013.01); *C22B 23/0423* (2013.01); *C25C 1/20* (2013.01); *Y02P 10/234* (2015.11)

(58) Field of Classification Search

CPC ......... C22B 23/0423; C22B 3/08; C22B 3/10; C22B 11/04–11/048; C22B 23/043; C25C 1/20

USPC ....... 423/22, 24–26, 28, 34, 35, 37–40, 488; 205/568; 75/743, 744

See application file for complete search history.

(56) References Cited

U.S. PATENT DOCUMENTS

| | | | | |
|---|---|---|---|---|
| 4,571,263 A * | 2/1986 | Weir | ....................... | C22B 11/04 205/568 |
| 4,723,998 A | 2/1988 | O'Neil | | |
| 7,544,231 B2 | 6/2009 | Bax et al. | | |
| 9,540,706 B2 * | 1/2017 | Liddell | ..................... | C22B 1/02 |

FOREIGN PATENT DOCUMENTS

| | | |
|---|---|---|
| AU | 2013263848 A1 | 6/2015 |
| EA | 008574 B1 | 6/2007 |
| RU | 2244760 C1 | 1/2005 |
| WO | 1999/060178 A1 | 11/1999 |
| WO | 9960178 A1 | 11/1999 |
| WO | 01/83835 A2 | 11/2001 |
| WO | 2014/009928 A1 | 1/2014 |
| WO | 2014009928 A1 | 1/2014 |

OTHER PUBLICATIONS

Liddell et al, "Energy consumption for Kell hydrometallurgical . . . PGM concentrates" The J. of the Southern African Institute of Mining and Metallurgy, vol. 111, Feb. 2011, pp. 127-132.*

Adams et al, Hydrometallurgical processing of Platreef flotation concentrate Minerals Engineering, 24, 2011, pp. 545-550.*

Pangum et al., Pressure chloride leaching of a refractory gold ore, Minerals Engineering, 9(5):547-556 (1996).

Ghobeiti et al., Simultaneous sulfide oxidation and gold leaching of a refractory gold concentrate by chloride-hypochlorite solu, Minerals Engineering, 50:140-142 (2012).

Extended European Search Report issued in corresponding European Patent Application No. EP15196464, dated Mar. 14, 2016.

European Search Report issued in corresponding Eurasian Patent Application No. 15196464.0-1362, dated Feb. 15, 2016.

Cameron, D.S., Noble Metal Recycling; In: Reference Module in Chemistry, Molecular Sciences and Chemical Engineering, Encyclopaedia of Electrochemical Power Sources, pp. 209-214, Elsevier, Amsterdam (2009).

* cited by examiner

*Primary Examiner* — Steven J Bos

(74) *Attorney, Agent, or Firm* — Browdy and Neimark, PLLC

(57) ABSTRACT

This invention describes a hydrometallurgical process for the recovery and separation of valuable elements, in particular gold and silver, from a feed material comprising a refractory, intractable or otherwise poorly responding to conventional treatment routes ores, concentrates and other materials. In particular, the process is a process integrated into one or more existing value element extraction processes.

27 Claims, 4 Drawing Sheets

TREATMENT PROCESS FOR EXTRACTION OF PRECIOUS, BASE AND RARE ELEMENTS

BACKGROUND OF THE INVENTION

This invention relates to a hydrometallurgical process for the recovery and separation of valuable elements, in particular gold and silver, from a feed material comprising a refractory, intractable or otherwise poorly responding to conventional treatment routes ores, concentrates and other materials. In particular, the process is a process integrated into one or more existing value element extraction processes.

Polymetallic orebodies containing multiple valuable metals at lower grades are becoming increasingly attractive for resource companies to assess their potential for exploitation, despite the greater metallurgical challenge in the recovery and separation of such elements into saleable concentrates or products. This is generally the case for ores containing precious metals such as gold or silver, platinum group metals (PGMs), and other valuable base and rare metals such as nickel, cobalt, copper, rare earth elements (REE) including yttrium and scandium, as well as uranium, thorium, manganese, zinc, cadmium, molybdenum, vanadium, titanium and other minor elements such as vanadium, germanium and gallium.

Current hydrometallurgical process routes for extraction of valuable metals from polymetallic orebodies are described in International Patent Publication No. WO 99/60178, known as the "Kell Process" (see FIG. 1)[1], International Patent Application No. WO2014/009928, and Australian Patent Application No. 2013263848 (the contents of each of which are incorporated herein by reference). All of these processes require as the starting material an ore or a concentrate of the ore and produce one or more leach liquors containing dissolved valuable metals and other elements. The Kell Process is typically specifically applied to PGM and base-metal containing concentrates.

The core of the Kell Process route comprises the steps of:

(i) leaching an ore or concentrate made from an ore in a pressure oxidation sulfate leach to dissolve base metal sulfides contained in the ore or concentrate and forming a sulfate leach filtrate containing base metals and a residue containing platinum group metals (PGMs);

(ii) separating the sulfate leach filtrate from the residue;

(iii) roasting or heat treating the residue to form a calcine; and (iv) leaching the calcine in a chloride leach to dissolve the PGMs into solution forming a chloride leach filtrate for PGM recovery and a solid waste residue.

However, a wide range of feed materials, in particular comprising refractory gold or silver-bearing ores or concentrates containing the precious metals gold or silver are problematic in that they return low recoveries of these metals, rendering conventional process routes such as cyanidation uneconomic or otherwise technically unsuitable for treatment of these materials[2].

These refractory or intractable ores, concentrates and other materials can be classified to fall into several categories, including:

1. Conventional refractory sulfides (gold or silver particles are smaller than conventional grind sizes and are encapsulated in various sulfide minerals)—typically treated by pressure or bacterial oxidation, roasting and/or ultrafine grinding;

2. Sub-microscopic refractory sulfides (sometimes referred to as "solid solution")—(gold or silver particles are so much smaller than conventional grind sizes that they cannot be observed using scanning electron microscopy and are encapsulated in various sulfide minerals)—typically treated by pressure or bacterial oxidation or roasting;
3. "Preg-robbing" materials (carbonaceous matter or other sorbent minerals such as clays are present that may lower gold and silver recoveries by adsorbing or "preg-robbing" the leached gold and silver from cyanide leach solutions)—typically treated by roasting or blinding with kerosene along with use of stronger cyanide solution and higher carbon addition;
4. Carbon-locked materials (carbonaceous matter such as kerogen is present that may lower gold and silver recoveries by physical encapsulation)—typically treated by roasting;
5. Double refractory sulfides (gold or silver particles are smaller than conventional grind sizes and are encapsulated in various sulfide minerals; carbonaceous matter or other sorbent minerals are also present that may lower gold and silver recoveries by physical encapsulation or "preg-robbing" from cyanide leach solutions)—typically treated by roasting or alkaline pressure oxidation;
6. Calcine tailings (residue after roasting and subsequent cyanide leaching of concentrates or ores, containing gold or silver physically encapsulated in the remaining matrix)—typically not treatable using conventional methods;
7. Silicate or aluminate-locked materials (alumina/siliceous matter or phases are present that may lower gold and silver recoveries by physical encapsulation, coating or adsorption)—typically not treatable using conventional methods;
8. Refractory material considered to bear microclusters containing gold or PGMs (e.g. "nanogold", "nanodimensional gold", "aurides", etc, that may also involve other elements such as Al, Si, Ti, V, Zr, Nb, Hg, Mo, W, Ag, Cu, Cs, La, etc; at which scale the bonds may be stronger than those between bulk atoms and hence the chemical behaviour of precious metals may be altered by the so-called "glue" effect)—typically not treatable using conventional methods;
9. Slags (residue after smelting of concentrates or ores, containing gold or silver physically encapsulated in the remaining matrix)—typically not treatable using conventional methods;
10. Amalgamation tailings (residue after mercury amalgamation of concentrates or ores, containing gold or silver physically encapsulated in the remaining matrix)—typically treated using roasting, along with stronger cyanide addition; and
11. Refractory mineral phases in ores containing gold or silver (examples include various slow or poorly cyanide-leaching minerals such as electrum Au—Ag, acanthite $Ag_2S$, aurostibite $AuSb_2$, calaverite $AuTe_2$, sylvanite $(Ag,Au)Te_2$, amongst others—typically treated using roasting or lime boil, along with stronger cyanide addition;
12. "e-Waste", spent catalysts and other precious-metals bearing wastes (a variety of such material with a range of metallurgical response characteristics is becoming increasingly available)—typically treated by a wide range of mechanical separation, pyro-metallurgical, hydrometallurgical, and bio-hydrometallurgical technologies;

13. Specific non-refractory concentrates (in particular, instances where the concentrates are low-grade, contain elements deleterious to conventional processing or the resource is too small to warrant a stand-alone treatment facility)—typically not treatable using conventional methods unless a toll treatment arrangement can be made with a suitable facility.

Using conventional methods would require a distinct and separate flowsheet to be developed and a stand-alone plant to be built for each material type and in some cases the material is not considered economically treatable using current available technology because ores contain a combination of categories of the above types of refractoriness.

An integrated process for treatment and recovery of value elements including precious, base and rare metals, and particularly gold or silver from any or a combination of these materials is therefore needed, rather than requiring a stand-alone plant to be built for each material type. It would further be useful if such a process was able to be integrated into the existing processes at plants, such as into the core Kell Process (as claimed in International Patent Publication No. WO 99/60178), or a modified Kell process (as claimed in either International Patent Application No. WO2014/009928, or Australian Patent Application No. 2013263848), or into other base and precious metals extraction processes, such as Heap Leaching, thereby benefiting from savings in capital, operating and infrastructure costs. A process whereby high-grade value metal concentrates or individual value metal products are produced onsite offers considerable financial benefit by eliminating refining charges.

Furthermore, the use of cyanide, a toxic chemical that is conventionally used in gold and silver processing and requires increasingly stringent control measures to satisfy tightening safety and environmental concerns from stakeholders and the community is problematic. An alternative process that does not require its use would be useful. Moreover, conventional processes generate $SO_2$ and other pollutants which are detrimental to the environment and an alternative, environmentally responsible method is needed[3].

SUMMARY OF THE INVENTION

According to a first embodiment of the invention, there is provided a hydrometallurgical process for extracting gold or silver or both and optionally one or more additional elements including PGMs, base elements, rare metals and/or rare elements, from a feed material comprising a refractory or intractable material, the process comprising the steps of:

(i) providing the feed material to a reaction vessel;

(ii) subjecting the feed material to one or more leaching steps comprising:

a) a hot sulfuric acid leaching step under pressure and/or atmospheric conditions to produce a product slurry comprising saleable metal sulfates in solution and a solid residue containing saleable metals;

b) optionally subjecting the slurry from a) to a conditioning step, wherein conditions are selected depending on gangue mineralogy, comprising sulfuric acid at from about 25-300 g/L or alkali treatment at a pH value of 10-14 (including, for example a lime boil);

c) optionally subjecting the solid residue from a) or b) to a heat treatment step at from about 300-700° C. or about 700-1000° C., (wherein conditions are selected depending on gangue mineralogy), under oxidising or reducing conditions;

d) subjecting the feed material, or the solid residue from step a) or where relevant, b) or c) above to a chloride leaching step in a chloride leaching medium to produce soluble saleable metals in a chloride pregnant leach solution (PLS);

e) subjecting the chloride PLS from step d) above to one or more techniques including ion exchange (IX), chelating, molecular recognition technology (MRT), addition of polymeric or other sorbents, solvent extraction, precipitation using hydroxides, ammonia, carbonates or sulfides, electrowinning, and/or reduction to produce one or more intermediate solid or solution products for the recovery of gold and silver, as well as any minor associated PGMs and other valuable base or rare metals in the chloride PLS;

f) optionally subjecting the intermediate solid or solution product from step e) above to a further purification and/or upgrade step comprising one or more techniques including IX, chelating, MRT, addition of polymeric or other sorbents; solvent extraction, precipitation using hydroxides, ammonia, carbonates or sulfides, electrowinning, and/or reduction;

g) optionally subjecting the intermediate solution product from step e) above to the recovery of hydrochloric acid, calcium and residual metals, by means of one or more steps including preboil, rectification, distillation, adsorption, reboil, and/or pyrohydrolysis, to yield a product slurry comprising a solid residue containing saleable metals and saleable metal sulfates in solution;

h) optionally subjecting the solid residue from step g) above to a chloride releaching step in a chloride leaching medium to produce soluble saleable metals in a purified chloride PLS;

i) optionally subjecting the discharge solution from step (e), (g) or (h) to a sorption step whereby saleable PMs are adsorbed to one or more resins or sorbents and base metals are discharged in a solution, or to a further sulfide precipitation step to produce a second product slurry, followed by solid-liquid separation of a secondary solid residue from the second product slurry for further purification by a method such as that outlined in (e) above, or direct sale to a third party; and j) optionally subjecting the chloride PLS from step h) above to one or more techniques including ion exchange (IX), chelating, molecular recognition technology (MRT), addition of polymeric or other sorbents, solvent extraction, precipitation using hydroxides, ammonia, carbonates or sulfides, electrowinning, and/or reduction to produce one or more intermediate solid or solution products for the recovery of gold and silver, as well as any minor associated PGMs and other valuable base or rare metals in the chloride PLS.

The refractory or intractable material may be selected from the group consisting of ores, concentrates, residues and other materials of the following categories:

(i) conventional refractory sulfides where gold or silver particles are smaller than conventional grind sizes and are encapsulated in various sulfide minerals;

(ii) sub-microscopic refractory sulfides, also referred to as "solid solution" refractory sulfides where gold or silver particles are so much smaller than conventional grind sizes that they cannot be observed using scanning electron microscopy and are encapsulated in various sulfide minerals;

(iii) "preg-robbing" materials in which carbonaceous matter or other sorbent minerals including clays are present that may lower gold and silver recoveries by adsorbing or "preg-robbing" the leached gold and silver from cyanide leach solutions;

(iv) carbon-locked materials in which carbonaceous matter including kerogen is present that may lower gold and silver recoveries by physical encapsulation;

(v) double refractory sulfides where gold or silver particles are smaller than conventional grind sizes and are encapsulated in various sulfide minerals and where carbonaceous matter or other sorbent minerals are also present that may lower gold and silver recoveries by physical encapsulation or "preg-robbing" from cyanide leach solutions;

(vi) calcine tailings which are the residue after roasting and subsequent cyanide leaching of concentrates or ores, containing gold or silver physically encapsulated in the remaining matrix;

(vii) silicate or aluminate-locked materials where alumina and/or siliceous matter or phases are present that may lower gold and silver recoveries by physical encapsulation, coating or adsorption;

(viii) refractory material considered to bear microclusters containing gold or PGMs, including "nanogold", "nanodimensional gold", and "aurides", that may also involve other elements including Al, Si, Ti, V, Zr, Nb, Hg, Mo, W, Ag, Cu, Cs, La at which scale the bonds may be stronger than those between bulk atoms and hence the chemical behaviour of precious metals may be altered by the so-called "glue" effect;

(ix) slags which are the residue after smelting of concentrates or ores, containing gold or silver physically encapsulated in the remaining matrix;

(x) amalgamation tailings which are the residue after mercury amalgamation of concentrates or ores, containing gold or silver physically encapsulated in the remaining matrix;

(xi) refractory mineral phases in ores containing gold or silver (including various slow or poorly cyanide-leaching minerals including electrum Au—Ag, acanthite $Ag_2S$, aurostibite $AuSb_2$, calaverite $AuTe_2$, sylvanite $(Ag,Au)Te_2$, amongst others;

(xii) "e-Waste", spent catalysts and other precious-metals bearing wastes; and (xiii) specific non-refractory concentrates including where conventional processing is not possible (e.g. cyanide usage is banned), the concentrates are low-grade, contain elements deleterious to conventional processing or the resource is too small to warrant a stand-alone treatment facility.

The process may further comprise a step of separating the solid residue containing saleable metals from the saleable metal sulfates in solution from the product slurry of steps a) or where relevant, b), f), or g) and then providing the resultant separated solid residue to any one of steps b), c) or d). The step of separating may be performed by filtration, or by any other solid/liquid separation means known to those skilled in the art.

The process may further comprise a step of separating the solid residue containing saleable metals from the saleable metal chlorides in solution from the product slurry of step d) and then providing the resultant separated chloride PLS to step e). The step of separating may be performed by filtration, or by any other solid/liquid separation means known to those skilled in the art.

The process may further comprise a step of recovery of saleable metals from the metal sulfates in solution from the product slurry of steps a) or where relevant, b) and/or from the intermediate product upgrade in step f), or from the metal sulfate residue produced in step g), by means of techniques such as solvent extraction, ion exchange, precipitation using hydroxides, ammonia, carbonates or sulfides, electrowinning, reduction, recycling and other techniques known to those skilled in the art based on techno-economic considerations.

The feed material ore, concentrate, residue or scrap material of (i) may be initially processed by crushing, milling or may be as-mined. Alternatively, or in addition, the feed material may be subjected to a beneficiation step to produce an intermediate ore product for providing to the reaction vessel. The beneficiation step may be performed by a combination of crushing, grinding, screening, sorting, sizing, classification, magnetic separation, electrostatic separation, flotation or gravity separation thereby to concentrate the valuable metals or reject a gangue component, or by other means of beneficiation known to those skilled in the art.

The feed material, ore, intermediate ore product, concentrate or the solid residue from step a) or b) may be subjected to a thermal treatment to produce a thermally treated calcine before subjecting it to step d).

The thermal treatment may be performed at about 80-750° C. for up to 120 minutes, typically about 300-700° C. for 10 to 30 minutes, under oxidizing, neutral or reducing conditions, to remove volatile components from the solid residue and reduce or negate the preg-robbing attributes of the material, whilst rendering refractory mineral phases such as silver jarosites suitable for recovery by subsequent leaching.

Additionally, the thermal treatment may be performed at about 500-1000° C. for up to 120 minutes, typically about 700-1000° C. for 30 to 120 minutes, under oxidizing, neutral or reducing conditions, to condition the saleable metals to be soluble in chloride leaching medium.

The thermal processes may be performed as individual steps of a sequential thermal treatment process, or as one combined step.

The product slurry of step a) may optionally be subjected to a hot acidic or alkaline conditioning step or an atmospheric leach step, to effect the removal or conversion of iron as jarosite or basic ferric sulfate (BFS) to liberate silver, as well as potentially iron, aluminium and magnesium sulfates, to the solution phase, and then subjected to step c).

In a further embodiment of the invention the chloride PLS of d) and the intermediate solid or solution product of e) in the first embodiment above may be subjected to a sorption step whereby saleable metals are adsorbed on to a resin or sorbent and base metals are discharged in a solution.

In a further embodiment of the invention the chloride PLS of d) and the intermediate solid or solution product of e) in the first embodiment above may be subjected to precipitation and purification comprising any one or more of the following steps:

(i) subjecting the chloride PLS of d) or the intermediate solid or solution product of e) above, or both to a reduction and sulfide precipitation step by addition of a solution containing one or a combination of salts or acids of sulfide, hydrogen sulfide, thiosulfate, metabisuphite or sulphite or a gas including sulfur dioxide or hydrogen sulfide, thereby to produce a product slurry comprising a solid residue containing elemental sulfur, metal sulfides and/or alloys and a discharge solution;

(ii) solid-liquid separation of the solid residue from step (i) above from the discharge solution, for example by filtration or by means of another suitable solid-liquid separation device, at temperatures of between about 10 and 130° C.;

(iii) subjecting the solid residue from step (ii) to a series of purification and recovery steps comprising:

a) a sulfur removal step comprising sublimation of the solid residue at temperatures of between about 200 and 500° C. (typically in a kiln or other suitable heat treatment device), to produce a solid residue and a sulfur product by sublimation, adsorption or scrubbing;

b) optionally subjecting the solid residue from step a) above to a sulfur removal step comprising dissolution of the solid residue (for example, in a stirred vessel or other suitable contactor) in a suitable solvent for sulfur, including but not limited to: aromatic hydrocarbons (e.g. xylene and/or its isomers or mixtures (such as xylol), toluene, ethylbenzene, etc.); chlorinated or sulphidised hydrocarbons (e.g. carbon tetrachloride, chloroform, carbon disulfide, etc.); or sulfur-containing ligands (e.g. sulphite, sulfide, etc.), at temperatures of between about 10 and 130° C., to yield a solid residue and a sulfur product by sublimation, adsorption or scrubbing;

c) subjecting the solid residue from step a), and b), where relevant, above to a pressure oxidation leach at temperatures of between about 110 and 230° C.;

d) subjecting the solid residue from step c) above to an atmospheric sulfuric acid leach at temperatures of between about 10 and 110° C. to yield a slurry comprising a solid residue including saleable metals and a sulfate leachate solution;

e) solid-liquid separation of the solid residue comprising saleable metals from step d) above from the sulfate leachate solution, for example by filtration or by means of another suitable solid-liquid separation device, at temperatures of between about 10 and 130° C.;

f) optionally subjecting the sulfate leachate solution from e) above to a sorption step whereby saleable metals are adsorbed to a resin or sorbent and base metals are discharged in a solution;

g) subjecting the sulfate leachate solution from e) and, where relevant, the discharge solution from f) to ageing, evaporation, precipitation and/or recycling into a Kell Process primary base metals recovery circuit as claimed in any one of WO99/60178, WO2014/009928, or Australian Patent Application No. 2013263848; and (iv) optionally subjecting the discharge solution from step (ii) to a sorption step whereby saleable metals are adsorbed to a resin or sorbent and base metals are discharged in a solution, or to a further sulfide precipitation step to produce a second product slurry, followed by solid-liquid separation of a secondary solid residue from the second product slurry for further purification by a method such as that outlined in (iii) above, or direct sale to a third party.

In a further embodiment of the invention, the discharge solution from step (ii) above and/or the intermediate solution product from step e) of the first embodiment of the invention may be subjected to a hydrochloric acid, calcium and residual base metal recovery and separation step comprising:

a) feeding the discharge solution and/or the intermediate solution product into a preboil evaporator together with seed gypsum thereby to generate a hydrochloric acid gas and gypsum precipitate, followed by solid-liquid separation to yield precipitated gypsum for recovery and a treated discharge solution;

b) feeding the discharge solution from step a) above to a sulfuric acid rectification column or reboiler together with sulfuric acid thereby to generate a hydrochloric acid gas and a sulfuric acid solution comprising saleable and/or recoverable base and/or rare metals;

c) alternatively, feeding the discharge solution from step a) above to a pyrohydrolysis reactor to yield a slurry comprising a solid iron oxide residue for recovery and a base and/or rare metals solution, followed by solid-liquid separation;

d) subjecting the sulfuric acid solution generated in step b) above and/or the base and/or rare metals metal solution from step c) above to a cooling and aging step, whereby the metal sulfate salts crystallise or are subjected to a sorption step and are recovered, for example by evaporation or precipitation and/or are recycled back into a Kell Process primary base metals recovery circuit as claimed in any one of WO99/60178, WO2014/009928, or Australian Patent Application No. 2013263848;

e) subjecting the hydrochloric acid gas of step a) or step b) above to distillation and absorption, thereby to recover a hydrochloric acid solution.

The recovered hydrochloric acid may be recycled back into the chloride leach step d) of the first embodiment of the invention. The recovered hydrochloric acid solution may be recycled back into a chloride leach step or a chlorination step of a Kell Process primary precious metals recovery circuit as claimed in WO99/60178, WO2014/009928, or Australian Patent Application No. 2013263848.

For example, the sulfuric acid comprising saleable or recoverable base and/or rare metals of step b) above may comprise metal sulfate salts, such as copper, nickel, cobalt, rhodium, ruthenium, iridium, vanadium, germanium, gallium or scandium.

The feed material may comprise either an individual material or a blend of materials differing in nature.

The process of the invention may optionally further comprise an initial step of subjecting the chloride PLS of step d) in the first embodiment of the invention to an ageing step for crystallisation of silica, comprising:

(i) feeding the chloride PLS into a holding vessel;

(ii) adding seed silica solids to the chloride PLS;

(iii) allowing the chloride PLS to stand at ambient temperature to precipitate out a solid residue comprising silica;

(iv) separating the precipitated solid residue comprising silica from the solution of (iii) to produce a silica-depleted solution; and (v) feeding the silica-depleted solution of (iv) into step (i) of the process.

The process of the invention may optionally comprise an initial step of subjecting the chloride PLS of step d) in the first embodiment of the invention to a concentration step to produce a concentrated PLS by any one or more of:

a) evaporation with condensation recovery of HCl; and/or b) reverse osmosis (RO), nanofiltration (NF), filtration or another membrane-based separation method.

The sorption steps of the process may comprise any one or more of the following steps:

a) contacting the solution with an ion exchange (IX) resin or other suitable sorbent whereby saleable metals, including gold, silver and PGMs if present, are adsorbed to the resin or sorbent and base metals are discharged in a solution; and/or b) eluting the adsorbed saleable metals, including gold, silver and PGMs if present, from the IX resin or sorbent and precipitating the gold, silver and PGMs if present, from the eluate using a reductant or, if PGMs are present, using a caustic, ammoniacal or reductant solution to form a high-grade value metal concentrate or individual value metal products; and/or c) directly incinerating the loaded resin or sorbent to produce a high-grade value metal concentrate or individual value metal products; and/or d) optionally, further processing of the saleable metals produced by any of steps (a) to (c) above.

The elution step (b) may be performed using a solution comprising acidic thiourea, salts of sulphite or hydrosulphite or chloride, or other eluants known to those skilled in the art.

In a further embodiment of the invention, the techniques described in international patent application no. WO2014/009928 (incorporated herein by reference) may be applied to the process of the invention, thereby to recover sulfuric acid and precipitate a potentially saleable or storable iron product. Specifically, the process may be as follows: 1) subjecting the concentrate to a modified pressure oxidation step to selectively separate base metals, from the precious metals into sulfate medium, wherein the modified pressure oxidation step partially or completely oxidizes base metal sulfide minerals to a mixture of sulfate and elemental sulfur, to produce a product slurry containing a base metal sulfates in solution and a solid residue containing precious metals along with a mixture of sulfate and elemental sulfur; 2) the product slurry from the modified pressure oxidation step 1) is optionally subjected to a hot acidic conditioning step (or atmospheric leach), to effect the removal of further iron as well as potentially aluminium and magnesium sulfates, to the solution phase; 3) the product slurry from the modified pressure oxidation step 1) and/or atmospheric leach step 2) is filtered to provide a solid residue containing precious metals along with a mixture of sulfate and elemental sulfur, and a filtrate containing base metal sulfates; 4) the solid residue from step 3) is subjected to a thermal treatment: a. to remove sulfate and elemental sulfur from the solid residue as disulfide, sulfur dioxide and/or hydrogen sulfide gas, and b. to condition the precious metals to be soluble in chloride medium; and 5) the treated solid residue from step 4) is subjected to precious metals recovery by leaching in chloride leaching medium to recover the precious metals. Moreover, the chloride PLS is optionally subjected to solvent extraction to remove additional iron.

Furthermore, technologies such as precipitation or crystallization may be employed in the process, including to the PLS or copper sulfate solutions, to produce a potentially saleable or storable ferric or ferrous hydroxide or sulfate product while recovering sulfuric acid into a stream suitable for recycling.

In an alternative embodiment of the invention, a conventional atmospheric or low-pressure leach using sulfuric acid may be applied directly to the product slurry comprising the sulfate PLS and solid residue of step a) of the first embodiment of the invention, thereby to remove excess iron sulfates from the solid residue into the sulfate PLS. The sulfate PLS may then be subjected to air- or oxygen-sparged ferric hydroxide precipitation under atmospheric or pressurized conditions for removal of excess iron sulfates.

Alternatively, or in addition to the conventional atmospheric or low-pressure leach using sulfuric acid applied directly to the product slurry comprising the sulfate PLS and solid residue of step a) of the first embodiment of the invention, where the solid residue is subjected to thermal treatment, excess soluble iron may be removed from the thermally treated calcine.

The chloride leaching medium of step e) of the first embodiment of the invention may contain iron chloride and may be treated by pressure, precipitation or crystallization, concentrated by evaporation, reverse osmosis, nanofiltration or other membrane technology, or treated by sparging/rectification, pyrohydrolysis or other technology known to those skilled in the art to produce an iron-bearing product.

The chloride leaching medium of step d) of the first embodiment of the invention may comprise hydrochloric acid or saline brine in conjunction with an oxidising agent such as chlorine, hypochlorite, nitric compounds, hydrogen peroxide or other oxidising agents known to those skilled in the art, and the refractory material of step (i) or solid residue of step a) of the first embodiment of the invention may be leached under oxidising conditions, thereby to generate a chloride PLS comprising one or more saleable elements including Au, Ag, PGMs, as well as Ni, Co, Cu, REE, Y, Sc, U, Th, Zn, Mn, Cd, Mo, V and Ti.

The chloride PLS comprising one or more saleable elements including Au, Ag, PGMs, as well as Ni, Co, Cu, REE, Y, Sc, U, Th, Zn, Mn, Cd, Mo, V and Ti may be subjected to separation and/or recovery of the one or more saleable elements by means of techniques such as solvent extraction, IX, precipitation using hydroxides, carbonates or sulfides, electrowinning, reduction and other techniques known to those skilled in the art based on techno-economic considerations.

The thermal processes may be performed as individual steps of a sequential thermal treatment process, or as one combined step. The oxidising chloride leaching medium set out above, or the chloride leaching medium of step d) of the first embodiment of the invention may contain iron chloride and may be treated by pressure, precipitation or crystallization, concentrated by evaporation, reverse osmosis, nanofiltration or other membrane technology, or treated by sparging/rectification, pyrohydrolysis or other technology known to those skilled in the art to produce an iron-bearing product.

In a further particular embodiment, the chloride leaching step d) of the first embodiment of the invention may comprise a less acidic chloride leaching medium having a pH of between about 2.5 and 7.5 held at a temperature in the range of 50-150° C.

In a further particular embodiment, the chloride leaching step d) of the first embodiment of the invention may comprise a chloride leaching medium with a free acidity of between about 50 to 300 g/L HCl held at a temperature in the range of 50-150° C.

According to a further particular embodiment, the chloride leaching step d) of the first embodiment of the invention may be performed by atmospheric or pressure autoclave leaching with saline brine under oxidising conditions.

Any one or more of the processes of the invention may be integrated into an existing process including for example, a "Kell Process" as claimed in WO 99/60178, or a modified Kell Process as claimed in WO2014/009928 or Australian Patent Application No. 2013263848, or a conventional heap leach process for base metal recovery.

DETAILED DESCRIPTION OF THE INVENTION

Figure 1:
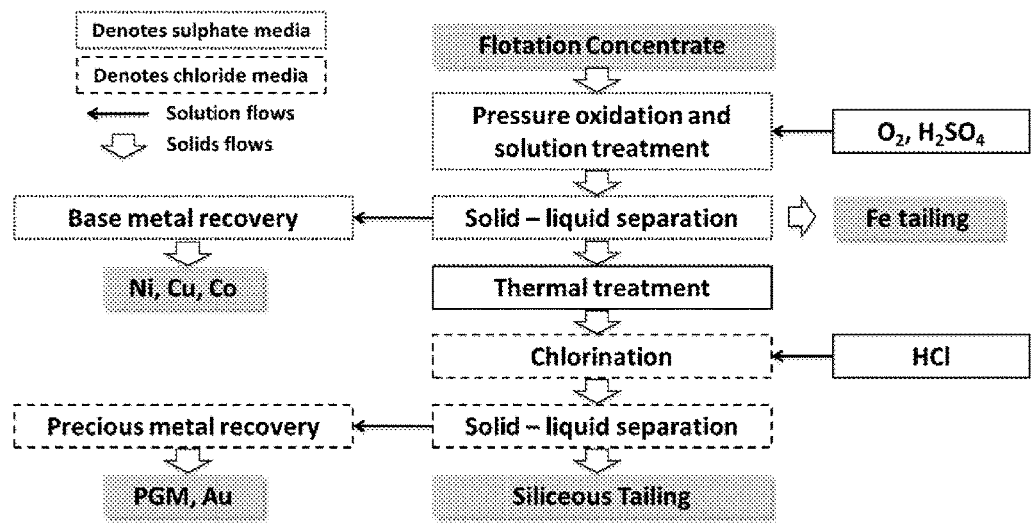
FIG. 1 is a simplified block flowsheet diagram of Kell process.

The current invention provides a hydrometallurgical process for the recovery and separation of valuable elements, in particular gold and silver, from a feed material comprising refractory, intractable or otherwise poorly responding to conventional treatment routes ores, concentrates and other materials. In particular, the process is a process integrated into one or more existing value element extraction processes.

Furthermore, process of the invention does not require the use of cyanide or mercury, toxic chemicals that are conventionally used in gold and silver processing that require stringent safety and environmental controls. Moreover, the process of the invention provides an alternative, environmentally responsible method for extraction of precious metals such as gold and silver that does not generate $SO_2$ and other pollutants which are detrimental to the environment.

The terms “element”, “mineral” and “metal” are used interchangeably in this specification.

“Refractory” is typically taken to mean a material that yields less than 90% gold and/or silver recovery when subjected to cyanide leaching, even under highly excess cyanide additions.

For the purpose of this application, the phrase “refractory or intractable material” means ores, concentrates, residues and other materials that are selected from the following categories:

1. Conventional refractory sulfides (gold or silver particles are smaller than conventional grind sizes and are encapsulated in various sulfide minerals)—typically treated by pressure or bacterial oxidation, roasting and/or ultrafine grinding;
2. Sub-microscopic refractory sulfides (sometimes referred to as “solid solution”)—(gold or silver particles are so much smaller than conventional grind sizes that they cannot be observed using scanning electron microscopy and are encapsulated in various sulfide minerals)—typically treated by pressure or bacterial oxidation or roasting;
3. “Preg-robbing” materials (carbonaceous matter or other sorbent minerals such as clays are present that may lower gold and silver recoveries by adsorbing or “preg-robbing” the leached gold and silver from cyanide leach solutions)—typically treated by roasting or blinding with kerosene along with use of stronger cyanide solution and higher carbon addition;
4. Carbon-locked materials (carbonaceous matter such as kerogen is present that may lower gold and silver recoveries by physical encapsulation)—typically treated by roasting;
5. Double refractory sulfides (gold or silver particles are smaller than conventional grind sizes and are encapsulated in various sulfide minerals; carbonaceous matter or other sorbent minerals are also present that may lower gold and silver recoveries by physical encapsulation or “preg-robbing” from cyanide leach solutions)—typically treated by roasting or alkaline pressure oxidation;
6. Calcine tailings (residue after roasting and subsequent cyanide leaching of concentrates or ores, containing gold or silver physically encapsulated in the remaining matrix)—typically not treatable using conventional methods;
7. Silicate or aluminate-locked materials (alumina/siliceous matter or phases are present that may lower gold and silver recoveries by physical encapsulation, coating or adsorption)—typically not treatable using conventional methods;
8. Refractory material considered to bear microclusters containing gold or PGMs (e.g. “nanogold”, “nanodimensional gold”, “aurides”, etc, that may also involve other elements such as Al, Si, Ti, V, Zr, Nb, Hg, Mo, W, Ag, Cu, Cs, La, etc; at which scale the bonds may be stronger than those between bulk atoms and hence the chemical behaviour of precious metals may be altered by the so-called “glue” effect)—typically not treatable using conventional methods;
9. Slags (residue after smelting of concentrates or ores, containing gold or silver physically encapsulated in the remaining matrix)—typically not treatable using conventional methods;
10. Amalgamation tailings (residue after mercury amalgamation of concentrates or ores, containing gold or silver physically encapsulated in the remaining matrix)—typically treated using roasting, along with stronger cyanide addition; and
11. Refractory mineral phases in ores containing gold or silver (examples include various slow or poorly cyanide-leaching minerals such as electrum Au—Ag, acanthite $Ag_2S$, aurostibite $AuSb_2$, calaverite $AuTe_2$, sylvanite $(Ag,Au)Te_2$, amongst others—typically treated using roasting or lime boil, along with stronger cyanide addition;
12. “e-Waste”, spent catalysts and other precious-metals bearing wastes (a variety of such material with a range of metallurgical response characteristics is becoming increasingly available)—typically treated by a wide range of mechanical separation, pyro-metallurgical, hydrometallurgical, and bio-hydrometallurgical technologies; or
13. Specific non-refractory concentrates (in particular, instances where conventional processing is not possible (e.g. cyanide usage is banned), the concentrates are low-grade, contain elements deleterious to conventional processing or the resource is too small to warrant a stand-alone treatment facility)—typically not treatable using conventional methods unless a toll treatment arrangement can be made with a suitable facility.

“PGMs” mean ruthenium (Ru), rhodium (Rh), palladium (Pd), osmium (Os), iridium (Ir), and platinum (Pt).

“Precious metals” means gold, (Au), silver (Ag), and PGMs in the few instances where precious metals bearing ores also contain associated minor PGMs.

As used herein, "base metals" means industrial non-ferrous metals excluding the precious metals, such as aluminum, copper, lead, nickel, tin, tungsten, zinc, cadmium and manganese. "Rare earth elements" means a group of chemically similar metallic elements comprising the lanthanide series (fifteen elements), scandium and yttrium. "Rare metals" means a group of metals including the rare earths, germanium, gallium, indium, scandium and other nominal valuable metals that may be worth recovering, including uranium, thorium, molybdenum and vanadium.

"KellGold" denotes the process described in the present application. "Kell" denotes the core process described in International Patent Publication No. WO 99/60178 and modified processes associated patents WO2014/009928 or Australian Patent Application No. 2013263848 (all incorporated herein by reference) for recovery of PGMs and base metals from concentrates.

For the purposes of this application the terms "pressure and/or atmospheric conditions" and "hot sulfuric acid leaching step" mean a sulfuric acid leaching step comprising either or a combination of a conventional atmospheric (20-100° C.), low (100-130° C.) medium (130-220° C.) or high (220-260° C.) temperature and pressure leach using sulfuric acid.

The term "a hot acidic conditioning step" means a conventional atmospheric (20-100° C.) or low (100-130° C.) temperature and pressure leach using sulfuric acid.

A "hot alkaline conditioning step" means a lime boil at a pH value of 10-14.

An "atmospheric leach step" means a conventional atmospheric (20-100° C.), temperature and pressure leach using sulfuric acid.

A "chloride leaching step" means a conventional atmospheric (20-100° C.) or low (100-130° C.) temperature and pressure leach under oxidising conditions using hydrochloric acid or saline brine in conjunction with an oxidising agent such as chlorine, hypochlorite, nitric compounds, hydrogen peroxide or others known to those skilled in the art.

The term "cooling and aging" in the context of this application means allowing PLS or other process liquor to stand for a period of time, optionally with addition of seed solids from a subsequent solid-liquid separation step and optionally with external cooling applied.

The term "saleable elements" or "saleable metals" means any element or metal that is able to generate a revenue through sale of the element or metal in metallic form or as a salt or precipitate of the metal or element.

There is a considerable range of materials that are either untreatable using current conventional technologies, or that respond poorly, or may require the specific flowsheet development, design and construction of a custom built plant that may be too costly to justify the capital spend given the size of the particular resource. In all cases, the ultimate precious metals recovery may be less than desirable. The applicants have developed a process as described herein that accepts a wide variety of refractory or non-refractory material types as feed, with no or minimal modifications to the circuit from one feed type to the next, and does not require the use of toxic cyanide or mercury-bearing reagents.

As is provided in more detail in the steps below, one important aspect of the invention which enables higher recovery of base metals and precious metals is the ability to recycle any sulfate stream that is produced within the chloride leaching circuit, including metal sulfate sludge from the HCl recovery circuit, and the PM sulfide pressure oxidation/atmospheric leach solution back into the sulfate leaching circuit for base metal recovery, provided that chloride has been removed from the solution. The solutions may be recycled back into the pressure oxidation feed or atmospheric leach feed, depending on the water and acid balance of the particular application. The enhanced recovery is achieved by a) the secondary leaching of base metals in the chloride leaching circuit and b) in the way that the HCl is regenerated by distillation from sulfuric acid.

For the purpose of reference, the "core Kell Process" for recovery of PGMs and base metals from concentrates is shown schematically in FIG. 1.

Figure 2:
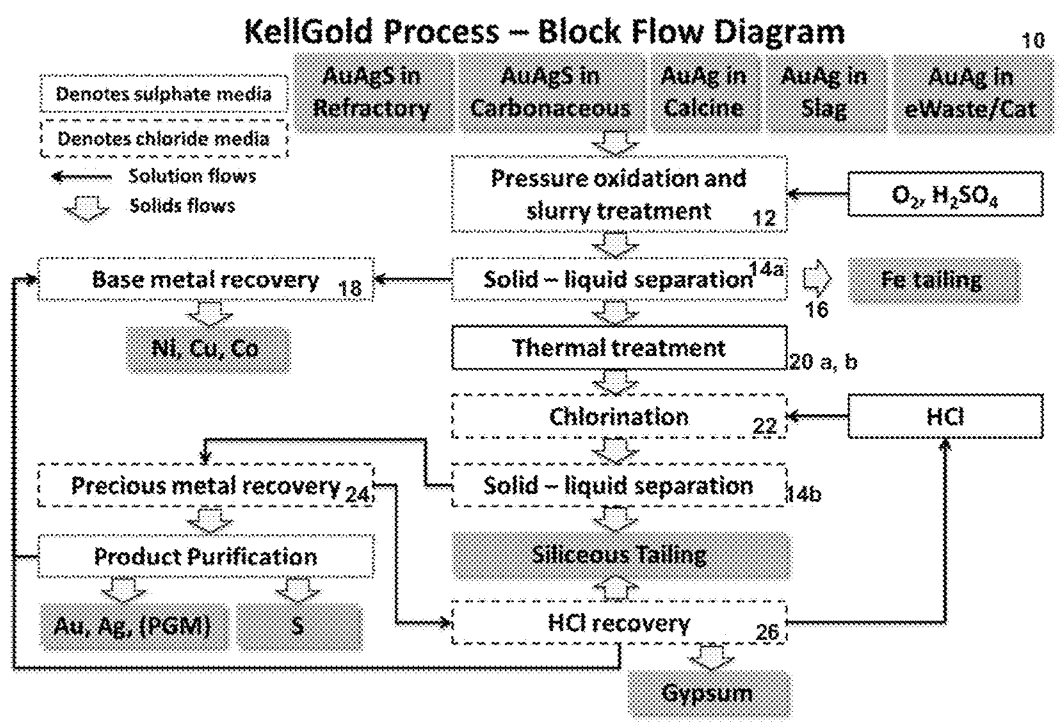
FIG. 2 is a simplified block flowsheet diagram showing the modified Kell process of the present invention (KellGold)

As illustrated in FIG. 2, the main embodiment of the invention is a hydrometallurgical process for extracting saleable elements including valuable metal, particularly gold and silver, from a range of quite different feed materials comprising refractory or intractable material types. The key to the process lies in its ability to obtain high Au and Ag recoveries, along with by-products such as Cu, Ni, Co, Zn, Mn, Sc, $H_2SO_4$, S, PGMs and others by treatment of separate or blended feed materials comprising various refractory, non-refractory and carbonaceous sulfides, silicates calcines and other materials by a multi-step but single process. Removal of the majority of the sulfur and base metals in the first stage of the process facilitates the ready removal of the precious metals and remaining base metals in the second stage of the process. This process completely avoids the use of toxic substances such as cyanide or mercury in the recovery process, and also avoids the emission of pollution to the atmosphere of sulfur dioxide and other environmentally sensitive elements.

The feed materials (10) input into the process can be as-mined, as-received or may be comminuted to a finer grain size. The input feed materials (10) may also have been subjected to a previous beneficiation step such as screening, sizing, classification, magnetic separation, electrostatic separation, dense media separation, radiometric sorting, optical sorting, or gravity separation to concentrate the valuable metals or reject a gangue component. However, the necessity and type of comminution or beneficiation at this stage would be dictated by the specific material's characteristics.

The process may comprise a first step where a feed material (10) is subjected to a hot sulfuric acid leaching step (12) under pressure and/or atmospheric conditions to produce a product slurry comprising valuable metal sulfates in solution and a solid residue containing valuable metals. The solid residue would then be separated from the metal sulfates in solution by a means of solid/liquid separation (14*a*), such as by filtration or other means known to those skilled in the art.

The sulfuric acid leach product slurry comprising the sulfate PLS and solid residue may be further treated by a conventional atmospheric or low-pressure leach using sulfuric acid (16), allowing removal or conversion of excess iron sulfates and/or jarosites from the solid residue into the sulfate PLS for removal by air- or oxygen-sparged ferric hydroxide precipitation under atmospheric or pressurized conditions.

If required for specific ore types, subjecting sulfuric acid leach product slurry to a conditioning step comprising acid or alkali treatment.

Saleable metals may be recovered by a base metal recovery step (18) from any of the solutions comprising metal sulfates, including the sulfuric acid leach product slurry by means of techniques such as solvent extraction, ion exchange, precipitation using hydroxides, ammonia, carbonates or sulfides, electrowinning, reduction, recycling and other techniques known to those skilled in the art based on techno-economic considerations.

Optionally, techniques described in International Patent Publication No. WO2014/009928 (the contents of which are incorporated herein by reference) may also be applied, allowing recovery of sulfuric acid and precipitation of a potentially saleable or storable iron product. Specifically, the solid residue may first be subjected to thermal treatment (20*a*) to produce off-gases comprising sulfur and the off-gases may then be subjected to a process of recovering sulfur:

a. by condensation as an elemental sulfur intermediate product;
b. into a sulfuric acid intermediate product; or
c. from dryer off-gases into a sulfide, polysulfide, polythionate, thiosulfate or similar intermediate product.

Typically, the thermal treatment would be performed at about 80-750° C. for up to 120 minutes, preferably at about 300-700° C. for 10 to 30 minutes, under oxidizing, neutral or reducing conditions, to remove volatile components from the solid residue and reduce or negate the preg-robbing properties of the material.

An additional thermal treatment (20*b*) may be performed if necessary at about 500-1000° C. for up to 120 minutes, preferably at about 700-1000° C. for 30 to 120 minutes, under oxidizing, neutral or reducing conditions, to condition the valuable metals to be soluble in chloride leaching medium. Additionally, this step can negate or modify the preg-robbing and encapsulation or coating properties of carbonaceous and clay minerals, thereby unlocking precious metals for leaching. For example, silver jarosite present in the material would decompose at 400-700° C. in the thermal treatment step, making silver available for chlorination leaching. However, if an economically sufficient proportion of the gold and silver is already soluble and the material does not exhibit preg-robbing characteristics without requirement of the additional thermal treatment, then this step may be omitted. The thermal processes may be performed as individual steps of a sequential thermal treatment process, or as one combined step.

The chloride leaching step (22) may be optimised for effective recovery and/or separation of some of the saleable elements that may be present in the multiple-composition feed. Specifically, the chloride leaching step (22) may be performed under oxidising conditions using hydrochloric acid or saline brine in conjunction with an oxidising agent such as chlorine, hypochlorite, nitric compounds, hydrogen peroxide or others known to those skilled in the art. Value elements such as Au, Ag, as well as Pt, Pd, Rh, Ru, Ir, Os (i.e. PGMs), Ni, Co, Cu, REE, Y, Sc, U, Th, Zn, Mn, Cd, Mo, V, Ti, Ge, Ga are leached into the chloride pregnant leach solution (PLS).

Precious metals, including gold and silver are separated and recovered (24) from chloride PLS by use of conventional methods known to those skilled in the art, and may include techniques such as solvent extraction, ion exchange, precipitation using hydroxides, carbonates or sulfides, electrowinning, reduction and others. Selection of specific unit processes for separation and/or recovery of by-product value elements is made based on techno-economic and product requirements considerations, such as the production of pure metals in the form of powder "sponge", cast bars, or end-product precursors, such as catalyst form solutions. In some instances, a less pure product may be preferable. Techniques such as solvent extraction, ion exchange, precipitation using hydroxides, carbonates or sulfides, electrowinning, reduction and others may be used to achieve separation and/or recovery of these elements from the chloride PLS. In particular, certain silver-bearing or gold-bearing ores alike which yield low recoveries using conventional treatment methods are expected to yield high recoveries using the KellGold process technique.

The saleable elements would in particular include gold and silver but may additionally include other valuable metals such as platinum group metals (PGMs) and rare metals. These metals are separated by means of the process from other valuable metals such as nickel, cobalt and copper, and additionally, rare earth elements, including yttrium and scandium, and uranium, thorium, vanadium, titanium, manganese, zinc and cadmium, whilst iron components may also be extracted as potentially saleable products.

The chloride and/or sulfate acids from the process may be recycled to reduce operational costs and additional amounts of metals may be recovered during this recycling process. For example, base metals such as nickel, copper and cobalt may be recovered as sulfates in wash waters from final residues and can be recycled along with sulfuric acid to sulfate streams earlier in the process. The recovered sulfate acid solutions may be recycled back into sulfate streams of a Kell Process primary base metals recovery circuit as claimed in any one of WO99/60178, WO2014/009928, or Australian Patent Application No. 2013263848.

Any minor fugitive gold, silver, PGMs or other value metals if present can likewise be recovered as chlorides in wash waters from final residues and can be recycled along with hydrochloric acid to chloride streams earlier in the process or recovered directly. For example, recovered hydrochloric acid solution may be recycled back into a chloride leach step or a chlorination step of a Kell Process primary precious metals recovery circuit as claimed in WO99/60178, WO2014/009928, or Australian Patent Application No. 2013263848.

IX, chelating (e.g. thiol, thiouronium, polyamine or other) sorbent resins, fibres, carbons, biological materials or other materials are capable of recovering small amounts of minor fugitive gold, silver, PGMs or other value metals if present, from sulfide precipitation barren, intermediate product upgrade liquors or base metal PLS.

Chlorination leaching requires the use of hydrochloric acid, which would benefit from recovery and recycle. Several outcomes are achieved by a particular process of subjecting the barren chloride stream from the chlorination leach step to a preboil-rectify-reboil treatment (26), enabling recovery of strong hydrochloric acid, removal of calcium and recovery of residual metal sulfate salts, such as copper, nickel, cobalt, rhodium, ruthenium, iridium, vanadium, germanium, gallium or scandium, for recycle or recovery. Barren chloride solution (after recovery of both primary and scavenged precious metals and other fugitive elements) is subjected to acid and metals recovery by exploiting differences in solubility of metal sulfates under the selected conditions. The barren chloride solution is contacted with 70% sulfuric acid and is preheated in a pre-boil stage in which the bulk of the hydrochloric acid is boiled off for recovery. Calcium is removed by the precipitation of gypsum in this stage, with subsequent solid-liquid separation by thickening and filtration, generating waste solids for disposal. Part of the thickener underflow is recycled to the contactor as seed material.

The low-calcium solution is introduced part way down a distillation column while additional 60-80% sulfuric acid is introduced to the top of the column at a rate dictated by the required recovered hydrochloric acid strength. A reboiler heated with steam or other means is used to heat the liquor at the bottom of the column to ~110-160° C., while the column tops are at ~95-1250° C. Water remains largely unvolatilised, while the remaining hydrochloric acid is almost completely volatilised.

Vapours from the column and pre-boiler pass through a water-cooled absorber column where the hydrochloric acid is recovered by absorption into chlorination filter wash water, producing 25-40% hydrochloric acid suitable for use in the primary chlorination leach while directly reusing wash water.

Diluted sulfuric acid (~35-65%) discharges from the bottom of the column and is passed into an evaporator to recover absorbed water for reuse, producing a ~60-80% sulfuric acid that is subjected to a cooling and aging step in storage tanks, where supersaturated metal sulfates crystallise and are harvested. The contained sulfuric acid and metals are recovered or reused by recycling them to the base metals recovery circuit of the KellGold Process, into the pre-leach, pressure oxidation and/or atmospheric acid leach steps. The acid content is used in the primary base metal leach circuit, while the metal sulfates dissolve in that step and are recovered in the base metal circuit, thereby increasing the overall base metal recovery of the process to high values.

The vapours from the evaporator pass into a water-cooled condenser where they are condensed into a liquor suitable for use as second-stage chlorination filter wash water. The concentrated (~60-80%) sulfuric acid that is recovered is recycled to a sulfuric acid makeup tank where 98% sulfuric acid is added to make up the sulfate that is removed to filter cake and recycled to the base metal circuit of the process. The made-up sulfuric acid is then available for reuse in the pre-boil and preheater sections of the circuit.

Figure 3:
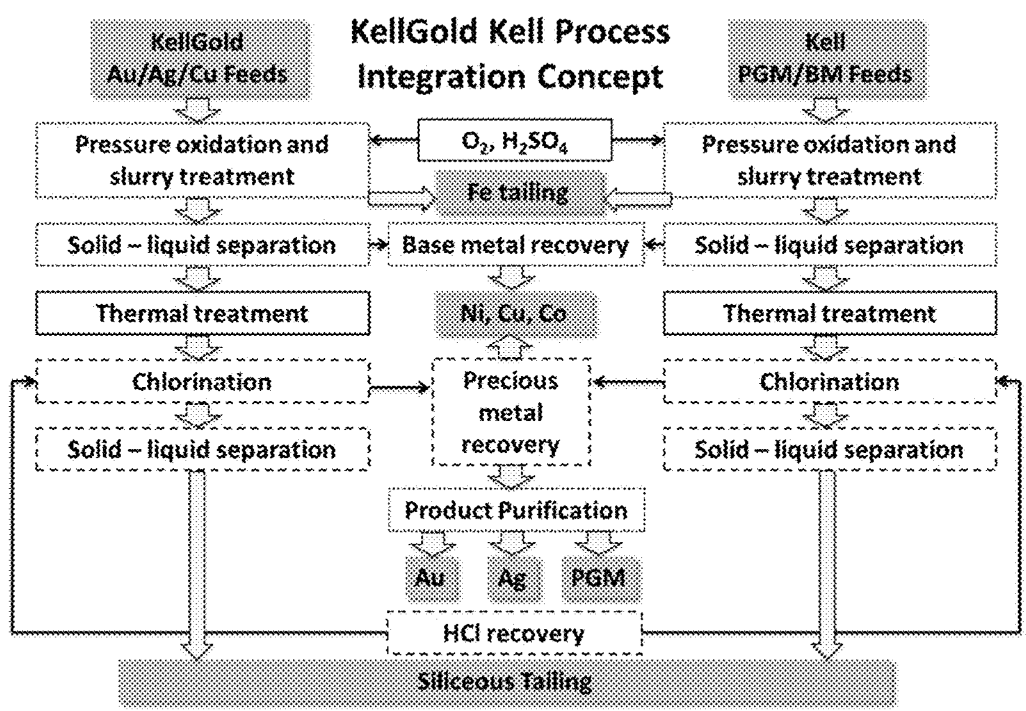
FIG. 3 is a simplified block flowsheet diagram illustrating the integration of the KellGold process of the present invention with the Kell process for PGM recovery, and other conventional processes.

In a further specific innovation described herein the KellGold process accrues significant techno-economic benefits by integration with a separate Kell Process plant for the recovery of PGMs and base metals from concentrates. As illustrated in FIG. 3, use of common reagents, preparation, base metals recovery, precious metals recovery and HCl recycling units or parts thereof, reduces the specific operating costs of both plants considerably. Moreover, the key ability of the KellGold plant to accept and "toll treat" feeds from multiple sources of various very different refractory, non-refractory and other problematic feed material types, is considered a significant innovation. Location of such a toll treatment facility alongside another similar facility presents clear benefits.

Figure 4:
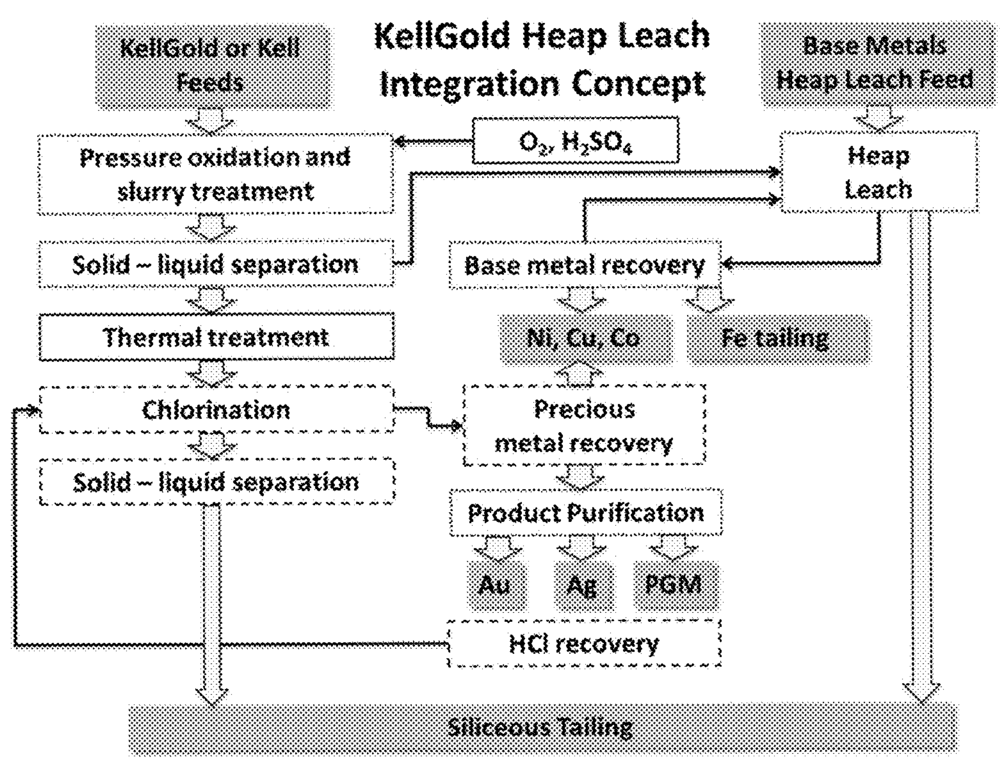
FIG. 4 is a simplified block flowsheet diagram illustrating the integration of the KellGold process of the present invention with a conventional heap leach process for base metal recovery, by way of illustration.

A further example of the potential synergies through co-location and integration is shown in FIG. 4. Heap leaching of low-grade copper ores in particular, but also nickel/cobalt and other metals, is now considered relatively common. The acid produced in the KellGold process is utilised by directing the sulfate PLS to the heap leach and associated base metal recovery circuit, achieving lower capital and operating costs than either as a stand-alone facility.

Higher-grade copper ores and concentrates typically contain gold, which is obtained as a smelter credit. Terms paid by smelters may be unfavourable for producers in remote locations and particularly smaller operations. The KellGold process can readily handle toll treatment of copper-gold concentrates, thereby providing a potentially attractive option for such operations to achieve higher metal recoveries and financial returns.

Extraction of Precious, Base and Rare Elements from Refractory or Intractable Materials of Different Types The following examples are provided to demonstrate the efficacy of the KellGold process described herein, which have been brought to bear on the recovery and separation of precious metals such as gold and silver, as well as base and/or rare metals from a variety of refractory or otherwise intractable or conventionally untreatable materials, resulting in potentially economic recovery and/or separation of multiple value elements and possible reuse or regeneration of reagents, and where removal of the majority of the sulfur and base metals in the first stage of the process facilitates the ready removal of the precious metals and remaining base metals in the second stage of the process.

These examples, however, are not to be construed as limiting in any way either the spirit or scope of the invention.

EXAMPLES

In the first of the following examples, tests are carried out on a range of material types to first demonstrate the superior extractability of value elements using the chlorination leach medium as preferred in the process described, as compared with inferior extractability of value elements using the cyanidation leach medium as typically used conventionally. In all these cases a comparative conventional cyanide leach bottle roll (BLEG) test was carried out using conditions considered standard in the industry.

In the subsequent examples, a full KellGold test was undertaken on a milled sample of each material, entailing pressure oxidation for base metals extraction, and chlorination leach for extraction of precious metals, such as Au and Ag.

Example 1

Extraction of Precious and Base Metals from Various Feedstocks

In this example, seven samples of selected refractory gold-bearing concentrates and process products were obtained for testing, covering a range of precious metal grades, copper, sulfur and organic carbon contents as well as degree of refractoriness to conventional cyanidation leaching. The head assays are summarised in Table 1, while the chloride and cyanide extractabilities are summarised in Table 2.

TABLE 1

Head Assays for Refractory Carbonaceous Sulfide Ore, Concentrates and Tailings

| Sample | Assay (g/t) | | | | | Assay (%) | |
|---|---|---|---|---|---|---|---|
| | Au | Ag | As | Cu | Sb | S | C |
| Carbonaceous Refractory Ore | 1.0 | 0.2 | 2,980 | 81 | 95.5 | 2.7 | 2.5 |
| Refractory Concentrate | 132.5 | 22.6 | 4,650 | 1,050 | 113.0 | 25.0 | 1.3 |
| Calcine Leach Tailings | 4.8 | 11.0 | 3,950 | 857 | 107.0 | 2.2 | 0.1 |
| Calcine Leach Tailings | 2.6 | 11.6 | 1,230 | 1,430 | 68.0 | 2.2 | 0.1 |
| Amalgamation Tailings | 1.5 | 0.8 | 2,270 | 133 | 25.3 | 0.0 | 0.0 |
| Refractory Concentrate | 21.2 | 50.9 | 88,000 | 2,190 | 717.0 | 28.7 | 1.4 |
| Cu/Au Concentrate | 67.6 | 54.5 | 652 | 170,000 | 10.2 | 26.0 | 0.2 |

Indicative percentage cyanide-extractable and chloride-extractable Au, Ag and Cu for the seven feedstocks under consideration are summarised in Table 2. This example gives a preliminary level of testing, where the results are indicative only of potential suitability of the material to processing with KellGold. The cyanide-soluble results are from single standard small-scale cyanide leach (BLEG) tests under conditions of excess cyanide and lime that have not been subjected to monitored and balanced leaching and collection of kinetic data and reagent consumptions. The chloride-extractable results are from single standard small-scale aqua regia leach tests under conditions of excess reagent that have not been subjected to monitored and balanced leaching with collection of kinetic data.

TABLE 2

Summary of KellGold Recoveries from Refractory Sulfide Ore, Concentrates and Tailings

| | Cyanide-Soluble, % | | | Chloride-Soluble, % | | |
|---|---|---|---|---|---|---|
| Sample | Au | Ag | Cu | Au | Ag | Cu |
| Carbonaceous Refractory Ore | 38 | 205* | 24 | 93 | 185* | 85 |
| Refractory Concentrate | 68 | 74 | 25 | 106 | 116 | 83 |
| Calcine Leach Tailings | 21 | 3 | 4 | 87 | 94 | 78 |
| Calcine Leach Tailings | 27 | 10 | 14 | 100 | 30 | 65 |
| Amalgamation Tailings | 82 | 116# | 4 | 124# | 139# | 86 |
| Refractory Concentrate | 3 | 51 | 53 | 99 | 89 | 83 |
| Cu/Au Concentrate | 8 | 0 | 1 | 100 | 108 | X |

*Anomalous head assay (~0.2 g/t Ag);
Anomalous head assay (suspected Hg interference);
X - not assayed The samples exhibit a range of cyanide extractabilities, with all of the seven samples being classified as refractory using the La Brooy[2] definition of <90% gold extractability by cyanidation (ranging from 3-82%). Silver and copper extractabilities by cyanidation are also generally low and by chlorination are generally high.

Example 2

Recovery of Precious and Base Metals from Refractory Gold Arsenopyrite Concentrate In this example, a refractory gold arsenopyrite concentrate was studied, and the head assay is summarised in Table 3. Approximately 2 kg of blended concentrate with no further grinding or other pretreatment was charged into a 15 L autoclave and subjected to pressure oxidation with oxygen injection for 60 minutes. The pressure was then released using a flash letdown system with slurry subsequently maintained in a stirred tank thereafter prior to solid-liquid separation by pressure filtration. The filter cake was dried and split for analysis and a portion (~0.5 kg) was slurried with a hydrochloric acid solution and subjected to chlorination in two stages with filtration between stages. The final residue was again subjected to chemical analysis to determine leach efficiencies of value elements. The KellGold recoveries are summarised in Table 4, showing recoveries in excess of 98% for Au, Ag and Cu. Copper is typically recoverable from solution by conventional means such as solvent extraction, electrowinning, ion exchange or precipitation. From the solid residue, from which reagent-consuming species are largely removed, Au and Ag may be obtained at the demonstrated high recoveries in the chlorination stage, along with remaining Cu.

TABLE 3

Head Assays for Refractory Gold Arsenopyrite Concentrate

| | Assay, g/t | | | Assay, % | | |
|---|---|---|---|---|---|---|
| Sample | Au | Ag | Cu | As | S | Fe |
| Refractory gold arsenopyrite conc | 21.2 | 45.1 | 2190 | 8.8 | 28.7 | 26.7 |

TABLE 4

Summary of KellGold Recoveries of Value Metals from Refractory Arsenopyrite Sulfide Concentrate

| | Recovery (%) | | |
|---|---|---|---|
| Sample | Au | Ag | Cu |
| Refractory gold arsenopyrite conc | 98.3 | 98.7 | 99.6 |

Example 3

Recovery of Precious and Base Metals from Refractory Gold Pyrite Concentrate

In this example, a refractory gold concentrate was studied, and the head assay is summarised in Table 5. Approximately 2 kg of blended concentrate with no further grinding or other pretreatment was charged into a 15 L autoclave and subjected to pressure oxidation with oxygen injection for 60 minutes. The pressure was then released using a flash letdown system with slurry subsequently maintained in a stirred tank thereafter prior to solid-liquid separation by pressure filtration. The filter cake was dried and split for analysis and a portion (~0.5 kg) was slurried with a hydrochloric acid solution and subjected to chlorination in two stages with filtration between stages. The final residue was again subjected to chemical analysis to determine leach efficiencies of value elements. The KellGold recoveries are summarised in Table 6, showing recoveries in excess of 95% for Au, Ni, Cu and Co. The base metals Ni, Cu and Co are typically recoverable from solution by conventional means such as solvent extraction, electrowinning, ion exchange or precipitation. From the solid residue, from which reagent-consuming species have are largely removed, Au and Ag are obtained at the demonstrated high recoveries in the chlorination stage, along with remaining Ni, Cu and Co.

TABLE 5

Head Assays of Refractory Gold Pyrite Concentrate

| | Assay, g/t | | | | Assay, % | |
|---|---|---|---|---|---|---|
| Sample | Au | Ni | Cu | Co | Fe | S |
| Refractory gold pyrite conc | 51 | 700 | 1500 | 390 | 20.6 | 15.2 |

TABLE 6

Summary of KellGold Recoveries of Value Metals from Refractory Gold Pyrite Concentrate

| | Recovery, % | | | |
|---|---|---|---|---|
| Sample | Au | Ni | Cu | Co |
| Refractory gold pyrite conc | 95.5 | 99.8 | 98.4 | 97.3 |

Example 4

Recovery of Precious and Base Metals from Refractory Polymetallic Sulfide Concentrate In this example, a refractory polymetallic Au—Ag—Cu—Zn—Pb concentrate was studied, and the head assay is summarised in Table 7. Approximately 2 kg of blended concentrate with no further grinding or other pretreatment was charged into a 15 L autoclave and subjected to pressure oxidation with oxygen injection for 60 minutes. The pressure was then released using a flash letdown system with slurry subsequently maintained in a stirred tank thereafter prior to solid-liquid separation by pressure filtration. The filter cake was dried and split for analysis and a portion (~0.5 kg) was slurried with a hydrochloric acid solution and subjected to chlorination in two stages with filtration between stages. The final residue was again subjected to chemical analysis to determine leach efficiencies of value elements. The KellGold recoveries are summarised in Table 8, showing recoveries in excess of 98% for Au, Ag, Cu, Zn and Pb. The base metals Cu and Zn are typically recoverable from solution by conventional means such as solvent extraction, electrowinning, ion exchange or precipitation. From the solid residue, from which reagent-consuming species are largely removed, Au and Ag as well as Pb are obtained at high recoveries in the chlorination stage, along with remaining Cu and Zn.

TABLE 7

Head Assays of Refractory Polymetallic Concentrate

| | Assay, g/t | | | Assay, % | | | |
|---|---|---|---|---|---|---|---|
| Sample | Au | Ag | Cu | Zn | Pb | Fe | S |
| Refractory polymetallic conc | 55.7 | 93 | 1970 | 3.1 | 3.0 | 16.8 | 37.1 |

TABLE 8

Summary of KellGold Recoveries of Value Metals from Refractory Polymetallic Concentrate

| | Recovery, % | | | | |
|---|---|---|---|---|---|
| Sample | Au | Ag | Cu | Zn | Pb |
| Refractory polymetallic conc | 98 | 100 | 98 | 100 | 99 |

REFERENCES

1. Liddell, K. S. and Adams, M. D. Kell hydrometallurgical process for extraction of platinum group metals and base metals from flotation concentrates, J. S. Afr. Inst. Min. Metall. Trans., vol. 112, January 2012, pp. 31-36.
2. La Brooy, S. R., Linge, H. G. and Walker, G. S. 1994. Review of gold extraction from ores. Minerals Engineering, vol. 7, no. 10, pp. 1213-1241.

What is claimed:

1. A hydrometallurgical process for extracting gold or silver or both and optionally one or more elements comprised of base elements, rare metals and rare elements, from a feed material comprising one or more refractory or intractable materials containing gold or silver or both and optionally one or more elements comprised of base and rare elements, the process comprising subjecting the feed material to the following steps:

(a) hot sulfuric acid leaching under temperature conditions of between 20° C. and 260° C. to produce a product slurry comprising saleable metal sulfates in solution and a solid residue containing saleable metals;

(b) conditioning the slurry from (a) in sulfuric acid at a concentration of from about 25-300 g/L, or in an alkali at a pH value of from about 10-14;

(c) separating the solid residue containing saleable metals from the saleable metal sulfates in solution from the product slurry of step (b), to yield a separated solid residue;

(d) chloride leaching the solid residue from step (c) in a chloride leaching medium to produce soluble saleable metals in a chloride pregnant leach solution (PLS);

(e) subjecting the chloride PLS from step (d) to one or more techniques comprising: ion exchange (IX), chelating, molecular recognition technology (MRT), addition of sorbents, solvent extraction, precipitation using hydroxides, ammonia, carbonates or sulfides, electrowinning, and reduction to produce one or more intermediate solid products and one or more intermediate solution products for the recovery of gold and silver, as well as any base or rare metals in the chloride PLS;

(f) recovering and separating hydrochloric acid, calcium and residual metals from the intermediate solution product from step (e) by means of one or more steps comprising: preboil, rectification, distillation, adsorption, reboil, and pyrohydrolysis, to yield a product slurry comprising a solid residue comprising saleable metals and saleable metal sulfates in solution; and (g) recovering the gold and silver, as well as any other valuable base or rare metals from the intermediate solid or solution products of step (e), or the solid residue or solution products of step (f).

2. The process according to claim 1, wherein the refractory or intractable material is selected from the group consisting of ores, concentrates and other materials of the following categories:

(i) refractory sulfides where gold or silver particles are encapsulated in sulfide minerals;

(ii) sub-microscopic refractory sulfides where gold or silver particles cannot be observed using scanning electron microscopy and are encapsulated in sulfide minerals;

(iii) preg-robbing materials comprising carbonaceous matter, sorbent minerals or clays that lower gold and silver recoveries by adsorbing or preg-robbing the leached gold and silver from cyanide leach solutions;

(iv) carbon-locked materials comprising carbonaceous matter or kerogen that may lower gold and silver recoveries by physical encapsulation;

(v) double refractory sulfides comprising carbonaceous matter or other sorbent minerals that lower gold and silver recoveries by physical encapsulation or preg-robbing from cyanide leach solutions and where gold or silver particles are encapsulated in sulfide minerals;

(vi) calcine tailings residue from roasting and subsequent cyanide leaching of concentrates or ores, comprising gold or silver physically encapsulated in a remaining matrix;

(vii) silicate or aluminate-locked materials comprising alumina and/or siliceous matter or phases that lower gold and silver recoveries by physical encapsulation, coating or adsorption;

(viii) refractory material comprising microclusters of gold or PGMs, nanogold, nanodimensional gold, or aurides, and optionally other elements including Al, Si, Ti, V, Zr, Nb, Hg, Mo, W, Ag, Cu, Cs, La;

(ix) slag residues comprising gold or silver physically encapsulated in a remaining matrix from smelting of concentrates or ores;

(x) amalgamation tailing residues comprising gold or silver physically encapsulated in a remaining matrix after mercury amalgamation of concentrates or ores;

(xi) refractory mineral phases in ores comprising one or more of gold, silver, electrum Au—Ag, acanthite Ag2S, aurostibite AuSb2, calaverite AuTe2, sylvanite (Ag,Au) Te2; and (xii) e-Waste or spent catalysts.

3. The process according to claim 1, wherein the feed material is initially processed by crushing, milling or is as-mined, or is alternatively, or additionally, subjected to beneficiation to produce an intermediate ore product for providing to the reaction vessel, wherein beneficiation comprises a combination of crushing, grinding, screening, sizing, classification, sorting, magnetic separation, electrostatic separation, flotation or gravity separation thereby to concentrate the valuable metals or reject a gangue component.

4. The process according to claim 1, wherein step (b) comprises subjecting the slurry from step (a) to hot acidic or alkaline conditioning or atmospheric leaching, to effect the removal or conversion of iron as jarosite or basic ferric sulfate (BFS) to liberate one or more metal sulfates comprising: silver, iron, aluminum and magnesium sulfates, to the solution phase, followed by subjecting the slurry to step (c).

5. The process according to claim 1, wherein the chloride PLS of step (d) or the intermediate solid product or intermediate solution product of step (e) are precipitated and purified by a process comprising the following steps:

(i) reduction and sulfide precipitation of the chloride PLS of step (d) or the intermediate solid product or intermediate solution product of step (e), or both by addition of:

(a) a solution comprising one or a combination of salts or acids of sulfide, hydrogen sulfide, thiosulfate, metabisulfite, or sulfite, or (b) a gas comprising sulfur dioxide or hydrogen sulfide thereby to produce a product slurry comprising a solid residue or by-product containing elemental sulfur, metal sulfides and/or alloys and a discharge solution;

(ii) solid-liquid separation of the solid residue from step (i) from the discharge solution by a solid-liquid separation means at temperatures of between about 10° C. and 130° C.;

(iii) subjecting the solid residue from step (ii) to a series of purification and recovery steps comprising:

(a) sulfur removal at temperatures of between about 200° C. and 500° C., to produce a solid residue and a sulfur product by sublimation, adsorption or scrubbing;

(b) subjecting the solid residue from step (iii) (a) to a pressure oxidation leach at temperatures of between about 110° C. and 230° C.;

(c) subjecting the solid residue from step (iii) (b) to an atmospheric sulfuric acid leach at temperatures of between about 10° C. and 110° C. to yield a slurry of a solid residue comprising saleable metals and a sulfate leachate solution;

(d) solid-liquid separation of the solid residue from step (iii) (c) from the sulfate leachate solution, by a solid-liquid separation means at temperatures of between about 10° C. and 130° C.; and (e) subjecting the sulfate leachate solution from step (iii) (d) to ageing, evaporation, precipitation and/or recycling.

6. The process according to claim 1, wherein the intermediate solution product from step (e) is subjected to a hydrochloric acid, calcium and residual base metal recovery and separation process comprising:

(i) feeding the discharge solution and/or the intermediate solution product into a preboil evaporator together with seed gypsum thereby to generate a hydrochloric acid gas and gypsum precipitate, followed by solid-liquid separation to yield precipitated gypsum for recovery and a treated discharge solution;

(ii) feeding the treated discharge solution from step (i) to:

(A) a sulfuric acid rectification column or reboiler together with sulfuric acid thereby generating a hydrochloric acid gas and a sulfuric acid solution comprising copper, nickel, cobalt, rhodium, ruthenium, iridium, vanadium, germanium, gallium or scandium; or (B) a pyrohydrolysis reactor to yield a slurry comprising a solid iron oxide residue for recovery and a base and/or rare metals solution, followed by solid-liquid separation;

(iii) subjecting the sulfuric acid solution generated in step ((ii)(A) and/or the base and/or rare metals metal solution from step (ii)(B) to a cooling and aging step, whereby metal sulfate salts are crystallized or are subjected to a sorption step and are recovered by evaporation or precipitation and/or are recycled; and (iv) subjecting the hydrochloric acid gas of step (i) or step (ii)(A) to distillation and absorption, thereby recovering a hydrochloric acid solution, and optionally recycling the recovered hydrochloric acid back into the chloride leach step (d).

7. The process according to claim 5, wherein the discharge solution from step (ii) is subjected to a hydrochloric acid, calcium and residual base metal recovery and separation step comprising:

(A) feeding the discharge solution and/or the intermediate solution product into a preboil evaporator together with seed gypsum thereby to generate a hydrochloric acid gas and gypsum precipitate, followed by solid-liquid separation to yield precipitated gypsum for recovery and a treated discharge solution;

(B) either feeding the treated discharge solution from step (A) to (I) a sulfuric acid rectification column or reboiler together with sulfuric acid thereby to generate a hydrochloric acid gas and a sulfuric acid solution comprising copper, nickel, cobalt, rhodium, ruthenium, iridium, vanadium, germanium, gallium or scandium; or (II) a pyrohydrolysis reactor to yield a slurry comprising a solid iron oxide residue for recovery and a base and/or rare metals solution, followed by solid-liquid separation;

(C) subjecting the sulfuric acid solution generated in step (B)(I) and/or the base and/or rare metals metal solution from step (B)(II) to a cooling and aging step, whereby metal sulfate salts are crystallized or are subjected to a sorption step and are recovered, including by evaporation or precipitation and/or are recycled; and (D) subjecting the hydrochloric acid gas of step (A) or step (B)(I) to distillation and absorption, thereby recovering a hydrochloric acid solution.

8. The process according to claim 1, wherein the feed material comprises either a single material or a blend of different materials.

9. The process according to claim 1, which further comprises an initial step of subjecting the chloride PLS of step (d) to ageing for crystallization of silica, comprising:

(i) feeding the chloride PLS into a holding vessel;

(ii) adding seed silica solids to the chloride PLS;

(iii) allowing the chloride PLS to stand at ambient temperature to precipitate out a solid residue comprising silica;

(iv) separating the precipitated solid residue comprising silica from the solution of step (iii) to produce a silica-depleted solution; and (v) feeding the silica-depleted solution of step (iv) into step (a).

10. The process according to claim 1, which further comprises an initial step of subjecting the chloride PLS of step (d) to a concentration step to produce a concentrated PLS by one or both of:

(I) evaporation with condensation recovery of HCl; and/or (II) a membrane-based separation method comprising reverse osmosis (RO), nanofiltration (NF) or filtration.

11. The process according to claim 1, wherein the sorption step comprises any one or more of the following steps:

(I) contacting the solution with a sorbent or IX resin whereby saleable metals comprised of gold and/or silver, are adsorbed to the resin or sorbent and base metals are discharged in a solution;

(II) eluting the adsorbed saleable metals from the IX resin or sorbent and precipitating the gold and/or silver from the eluate using a reductant to form a high-grade value metal concentrate or individual value metal products;

(III) directly incinerating the loaded resin or sorbent to produce a high-grade value metal concentrate or individual value metal products; and (IV) further processing of the saleable metals produced by any of steps (I) to III).

12. The process according to claim 11, wherein the elution step (II) is performed using a solution comprising acidic thiourea, or salts of sulfite or hydrosulfite or chloride.

13. The process according to claim 1, wherein the process comprises recovery of sulfuric acid and precipitation of a potentially saleable or storable iron product, further comprising the steps of:

(i) subjecting the feed material to a modified pressure oxidation step to selectively separate base metals, from the precious metals into sulfate medium, wherein the modified pressure oxidation step partially or completely oxidizes base metal sulfide minerals to a mixture of sulfate and elemental sulfur, to produce a product slurry containing base metal sulfates in solution and a solid residue containing precious metals along with a mixture of sulfate and elemental sulfur;

(ii) subjecting the product slurry from the modified pressure oxidation step (i) to hot acidic conditioning or atmospheric leaching, to effect removal of further one or more elements comprising iron sulfates, aluminum sulfates or magnesium sulfates, to the solution phase;

(iii) filtering the product slurry from the modified pressure oxidation step (i) and/or from the conditioning or atmospheric leaching step (ii) to provide a solid residue comprising precious metals and a mixture of sulfate and elemental sulfur, and a filtrate comprising base metal sulfates;

(iv) thermally treating the solid residue from step (iii) to remove sulfate and elemental sulfur from the solid residue as disulfide, sulfur dioxide and/or hydrogen sulfide gas, and to condition the precious metals to be soluble in chloride medium;

(v) recovering precious metals from the treated solid residue from step (iv) by leaching in chloride leaching medium; and (vi) optionally, performing solvent extraction of the chloride PLS to remove additional iron.

14. The process according to claim 1, comprising employing precipitation or crystallization to the metal sulfates in solution, to produce a ferric or ferrous hydroxide or a sulfate product while recovering sulfuric acid into a stream suitable for recycling.

15. The process according to claim 1, wherein an atmospheric or low-pressure leach using sulfuric acid is applied directly to the product slurry comprising the metal sulfates in solution and solid residue of step (a), thereby to remove excess iron sulfates from the solid residue into the metal sulfates in solution, followed by optionally subjecting the metal sulfates in solution to air- or oxygen-sparged ferric hydroxide precipitation under atmospheric or pressurized conditions for removal of excess iron sulfates.

16. The process according to claim 1, wherein the chloride leaching medium of step (d) comprises hydrochloric acid or saline brine in conjunction with an oxidizing agent including chlorine, hypochlorite, nitric compounds or hydrogen peroxide, and the refractory material of or solid residue of step (a) is leached under oxidizing conditions, to generate a chloride PLS comprising one or more saleable elements including Au, Ag, Ni, Co, Cu, rare earth elements, Y, Sc, U, Th, Zn, Mn, Cd, Mo, V and Ti, and the chloride PLS is optionally further subjected to separation and/or recovery of the one or more saleable elements by means of one or more techniques including solvent extraction, IX, precipitation using hydroxides, carbonates or sulfides, electrowinning, and reduction.

17. The process according to claim 1, wherein the chloride leaching medium of step (d) or step (e), contains iron chloride, the process further comprising a step of treatment by pressure, precipitation or crystallization, concentration by evaporation, or a membrane-based separation technology comprising reverse osmosis, nanofiltration or filtration, or treatment by sparging/rectification, and/or pyrohydrolysis to produce an iron-bearing product.

18. The process according to claim 16, wherein the chloride leaching medium contains iron chloride, the process further comprising a step of treatment by pressure, precipitation or crystallization, concentration by evaporation, or a membrane-based separation technology including reverse osmosis, nanofiltration, or treatment by sparging/rectification, and/or pyrohydrolysis to produce an iron-bearing product.

19. The process according to claim 1, wherein the chloride leaching step (d) comprises an acidic chloride leaching medium having a pH of between about 2.5 and 7.5 held at a temperature in the range of 50-150° C.

20. The process according to claim 1, wherein, the chloride leaching step (d) utilizes a chloride leaching medium with a free acidity of between about 50 to 300 g/L HCl held at a temperature in the range of 50-150° C.

21. The process according to claim 1, wherein the chloride leaching step (d) is performed by atmospheric or pressure autoclave leaching with saline brine under oxidizing conditions.

22. The process according to claim 1, wherein the process is integrated into an existing base metal extraction process.

23. The process according to claim 1, which further comprises chloride releaching of the solid residue from step (f) in a chloride leaching medium to produce soluble saleable metals in a purified chloride PLS.

24. The process according to claim 23, which further comprises one or more of the following additional steps:

(I) subjecting the soluble saleable metals to a sorption step whereby saleable gold and silver is adsorbed to one or more resins or sorbents and base metals are discharged in a solution, or subjecting the soluble saleable metals to a further sulfide precipitation step to produce a second product slurry, followed by solid-liquid separation of a secondary solid residue from the second product slurry for further purification by a method according to step (e), or sale of the secondary solid residue; and (II) subjecting the chloride PLS to one or more of IX, chelating, MRT, addition of sorbents, solvent extraction, precipitation using hydroxides, ammonia, carbonates or sulfides, electrowinning, and reduction to produce one or more intermediate solid or solution products for the recovery of gold and silver, as well as any other valuable base or rare metals in the chloride PLS.

25. The process according to claim 1, which further comprises subjecting the feed material to any one or more of the following additional steps:

(h) subjecting the intermediate solid product or the intermediate solution product from step (e) to a further purification and/or upgrade step comprising one or more of the following techniques: IX, chelating, MRT, addition of sorbents; solvent extraction, precipitation using hydroxides, ammonia, carbonates or sulfides, electrowinning, and reduction to yield a solid residue and a solution product;

(i) subjecting the intermediate solution product from step (e) or saleable metal sulfate solution product of step (f) to a sorption step whereby saleable gold and silver is adsorbed to one or more resins or sorbents and base metals are discharged in a solution, or subjecting the intermediate solution product from step (e) or saleable metal sulfate solution product of step (f) to a further sulfide precipitation step to produce a second product slurry, followed by solid-liquid separation of a secondary solid residue from the second product slurry for further purification by a method according to step (e), or sale of the secondary solid residue;

(j) separating the solid residue containing saleable metals from the saleable metal sulfates in solution from the product slurry of steps (a), (b), (f) or (i) and then providing the resultant separated solid residue to either step (b) or (d);

(k) recovering the saleable metals from the metal sulfates in solution from the product slurry of steps (a) or (b), or the saleable metal sulfates in solution of step (f), or the solution product of step (h) by means of one or more of:

(A) solvent extraction, (B) IX, (C) precipitation using hydroxides, ammonia, carbonates or sulfides, (D) electrowinning, (E) reduction, and (F) recycling.

26. The process according to claim 5, wherein the series of purification and recovery steps comprises any one or more of the following steps:

(A) subjecting the solid residue from step (iii) (a) to sulfur removal comprising dissolution of the solid residue in a suitable solvent for sulfur, comprising aromatic hydrocarbons, chlorinated or sulfidized hydrocarbons, or sulfur-containing ligands at temperatures of between about 10° C. and 130° C., followed by sublimation, adsorption or scrubbing to yield a solid residue and a sulfur product;

(B) sorption of the sulfate leachate solution from step (iii) (d), whereby saleable metals are adsorbed to a resin or sorbent and base metals are discharged in a solution;

(C) subjecting the discharge solution from step (b) above to ageing, evaporation, precipitation and/or recycling; and (D) sorption of the discharge solution from step (ii), whereby saleable metals are adsorbed on to a resin or sorbent and base metals are discharged in a solution, or sulfide precipitation of the discharge solution from step (ii) to produce a second product slurry, followed by solid-liquid separation of a secondary solid residue from the second product slurry for further purification of the secondary solid residue by the method of step (iii).

27. The process according to claim 7, wherein the recovered hydrochloric acid solution recovered in step (I) is recycled back into the chloride leach of step (d).

* * * * *